United States Patent [19]

Roussin

[11] 4,345,768

[45] Aug. 24, 1982

[54] SELF PUMPING SEAL FOR A RECIPROCATING MEMBER

[75] Inventor: Michael A. Roussin, Peoria, Ill.

[73] Assignee: Caterpillar Tractor Co., Peoria, Ill.

[21] Appl. No.: 108,907

[22] PCT Filed: Oct. 29, 1979

[86] PCT No.: PCT/US79/00918

§ 371 Date: Oct. 29, 1979

§ 102(e) Date: Oct. 29, 1979

[87] PCT Pub. No.: WO81/01182

PCT Pub. Date: Apr. 30, 1981

[51] Int. Cl.[3] ........................ F01B 19/02; F04B 45/04; F16J 15/56

[52] U.S. Cl. ........................................ 277/22; 277/15; 277/17; 277/33; 277/212 F; 92/99; 74/18

[58] Field of Search .............................. 277/12, 15–22, 277/33, 205, 212 R, 212 C, 212 F; 92/99; 74/18, 18.2

[56] References Cited

U.S. PATENT DOCUMENTS

| | | | |
|---|---|---|---|
| 2,387,066 | 10/1945 | Harding | 267/122 X |
| 2,725,078 | 11/1955 | Glancy | 137/791 |
| 2,824,759 | 2/1958 | Tracy | 277/22 X |
| 3,039,399 | 6/1962 | Everett | 417/536 |
| 3,884,482 | 5/1975 | Ball et al. | 277/41 X |
| 3,912,045 | 10/1975 | Morris | 184/27 R |
| 3,922,017 | 11/1975 | Cobb | 299/70 |
| 4,049,366 | 9/1977 | Becker | 417/569 |

*Primary Examiner*—Robert S. Ward, Jr.
*Attorney, Agent, or Firm*—Phillips, Moore, Weissenberger, Lempio & Majestic

[57] ABSTRACT

A self pumping seal for a reciprocating member (12) provides cooling fluid to the reciprocating member (12) with degradation of an elastomeric seal (34) lessened by separating the elastomeric seal (34) from the higher temperatures of the machinery. Separation is provided by a relatively heat insensitive rigid seal (24).

12 Claims, 2 Drawing Figures

SELF PUMPING SEAL FOR A RECIPROCATING MEMBER

DESCRIPTION

1. Technical Field

A self pumping seal assembly for a reciprocating member provides lubricant and cooling fluid to the reciprocating member and seal assembly. Degradation of the relatively long life elastomeric seal is reduced by a relatively rigid seal separating the hot portions of the machinery from heat sensitive elastomeric seal.

2. Background Art

In reciprocating machinery, and particularly rock breakers, there is a requirement for a seal on the reciprocating shank of the rock breaker to isolate the reciprocating mechanism, usually an eccentric, from the abrasive atmosphere inherent in rock breaking operations. The normal procedure has been to provide a boot seal between the machinery frame and the reciprocating member. The commonly used boot seal has, in part, been dictated by the displacement of the shank which, in some cases, may be as much as 8½ to 9 centimeters. Recent developments in the rock breaking art have provided high velocity short stroke intermediate impact links with displacements of the link of approximately 1½ centimeters. In either type of rock breaker the operating temperature of the lubricating fluid surrounding the eccentric is high enough to influence the fatigue life of elastomeric seals.

The limited displacement type intermediate impact link permits a dual seal assembly consisting of a shear type seal of an elastomeric material that is affixed to the housing or machine frame and also to the reciprocating member and a stationary, more rigid, seal affixed to the housing and sliding relative to the reciprocating member. Because of the high frequencies and velocities experienced by the intermediate impact link, the fatigue life of the elastomeric seal is of prime importance. Natural rubber has the best fatigue properties of any elastomeric material, however natural rubber is particularly susceptible to attack by petroleum products. Synthetic elastomers, such as "Neoprene," have a lower susceptibility to attack by oil, but also have a shorter fatigue life. In either case the temperature of the oil and the surrounding machinery is also a limiting factor since temperature decreases the fatigue life of any elastomer conservatively by a factor of 1/100th per 37.8° C.

It thus becomes advantageous to separate the elastomeric seal member from a temperature source. Further it is appropriate to separate the elastomeric seal from hot lubricant or petroleum particularly if natural rubber is used for a seal. As set forth above, any reduction in operating temperature of the seal will increase the life of the various seal members.

DISCLOSURE OF INVENTION

The present invention is directed to overcoming one or more of the problems as set forth above.

In one aspect of this invention a seal arrangement is provided for an impact device which includes a housing and a reciprocating member mounted in the housing. The seal arrangement comprises a relatively rigid seal member sealingly associating the reciprocating member with the housing and a flexible seal member also sealingly associating the reciprocating member with the housing. The flexible seal member forms a variable volume cavity with the rigid seal member so that a source of cooling fluid may be communicated to the variable volume cavity.

This invention permits the use of an elastomeric seal on a high-speed relatively short displacement impact link of a reciprocating device such as a rock breaker. The use of the rigid seal and the flexible seal allows the reciprocating action to vary the volume of the variable volume cavity to draw cooling fluid into the variable volume cavity thus serving the purpose of increasing the fatigue life of the various seal members by providing the necessary cooling to the seal arrangement.

BEST MODE FOR CARRYING OUT THE INVENTION

Figure 1:
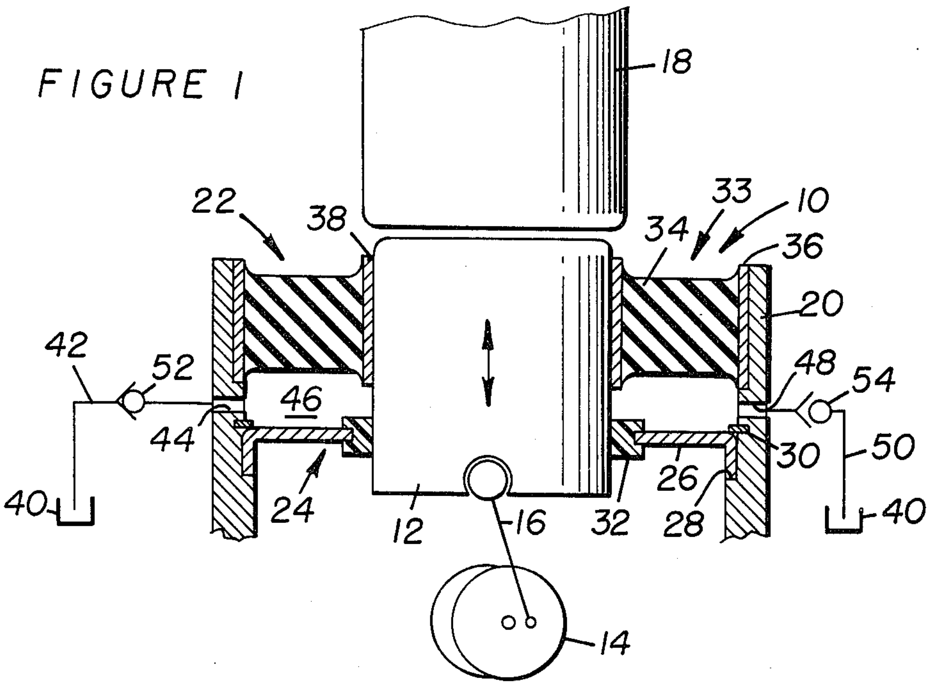
FIG. 1 is an embodiment of this invention shown partly in section and partly schematically with the reciprocating member in the "at rest" position.

Referring to FIG. 1, a self pumping seal assembly 10 for a reciprocating member 12 is shown. Reciprocating member 12 may be an intermediate impact link in a rock breaker. The reciprocating member 12 is reciprocated for example, by means of an eccentric 14 schematically shown in FIG. 1 and FIG. 2. Eccentric 14 may be driven by any appropriate prime mover (not shown). Eccentric 14 may operate on reciprocating member 12 by means of a link 16 which need not be mechanically fastened to either eccentric 14 or reciprocating member 12. In the rock breaker application, reciprocating member 12 may act intermittently on a hammer 18 which in turn works on the rock to be broken. It is to be understood that hammer 18 is mounted for movement on the larger rock breaker machine (not shown).

Eccentric 14 is mounted for movement in a housing 20 with reciprocating member 12 extending outwardly through an opening 22 for engagement with hammer 18. Housing 20 is enclosed and usually contains a quantity of fluid. A relatively rigid means for sealing reciprocating member 12 with housing 20 is provided by relatively rigid seal sub assembly 24. The relatively rigid seal sub assembly 24 may include a member 26 which is preferably metallic and mounted in housing 20 on a shoulder 28. Rigid seal sub assembly 24 is retained adjacent shoulder 28 by a ring 30 which may be of the conventional split ring type. Member 26, if used, may be formed with an L shaped cross-section as shown in FIG. 1 although this shape is not to be considered limiting.

A first seal means affixed to member 26 takes the form of an annular ring and preferably contains fluoroplastic material such polytetrafluoroethylene (Teflon) in combination with nylon although fluoroplastic materials may be used alone. Hereinafter this polytetrafluoroethylene and nylon seal 32 will be indentified as seal 32. Use of polytetrafluoroethylene material having the Teflon trade name is not necessarily limiting since other materials having properties similar to polytetrafluoroethylene may also be used.

Seal 32 provides a low friction sliding seal portion of relatively rigid seal sub assembly 24 between reciprocating member 12 and housing 20 so that lubricant normally carried in the housing 20 in the vicinity of eccentric 14 will not be pumped outwardly of housing 20 by the reciprocation of member 12. Because of the inert nature of seal 32, heat and lubricant impinging thereupon have little or no effect on the chemical nature of the material. Thus the fatigue life of seal 32 is not substantially reduced by the conditions associated with operation of eccentric 14.

In addition to seal 32, the self pumping seal assembly 10 includes a second seal means such as flexible seal sub assembly 33 which in turn includes elastomeric seal 34 in the form of an annular ring affixed to housing 20 by appropriate fastening means 36 on the outer diameter of seal 34. Elastomeric seal 34 is affixed on its inner diameter to reciprocating member 12 by appropriate fasting means 38. With this second seal means affixed to both the housing and reciprocating member 12, the seal takes on the form of a shear seal. Although natural rubber may be used for elastomeric seal 34, a synthetic rubber formed by polychloroprene (trade name Neoprene) has been found particularly appropriate for this seal because of its resistance to petroleum products.

A source of cooling fluid 40 communicates a coolant through means such as conduit 42 to a port 44. Port 44 opens into the variable volume cavity 46 formed by flexible seal sub assembly 33 and the relatively rigid seal sub assembly 24. Also communicating with variable volume cavity 46 is a port 48 which leads to a conduit 50 which in turn communicates with the source of cooling fluid 40. A check valve 52, which may be appropriately positioned in conduit 42, permits a flow of fluid from the source of cooling fluid 40 to the variable volume cavity 46. Similarly a check valve 54 may be located in conduit 50 permitting communication through conduit 50 to the source of fluid from variable volume cavity 46. It should be noted that a double check valve arrangement could be placed in conduit 42 permitting fluid flow in both directions in that one conduit. This arrangement, which is not shown, would eliminate the need for conduit 50.

INDUSTRIAL APPLICABILITY

The self pumping seal 10 for a reciprocating member described herein is particularly applicable in the rock breaking art. Specifically hammer 18 may be fitted with a rock breaking tip (not shown) so that repeated impact of reciprocating member 12 acting on hammer 18 results in a force being applied to a rock for breaking.

Figure 2:
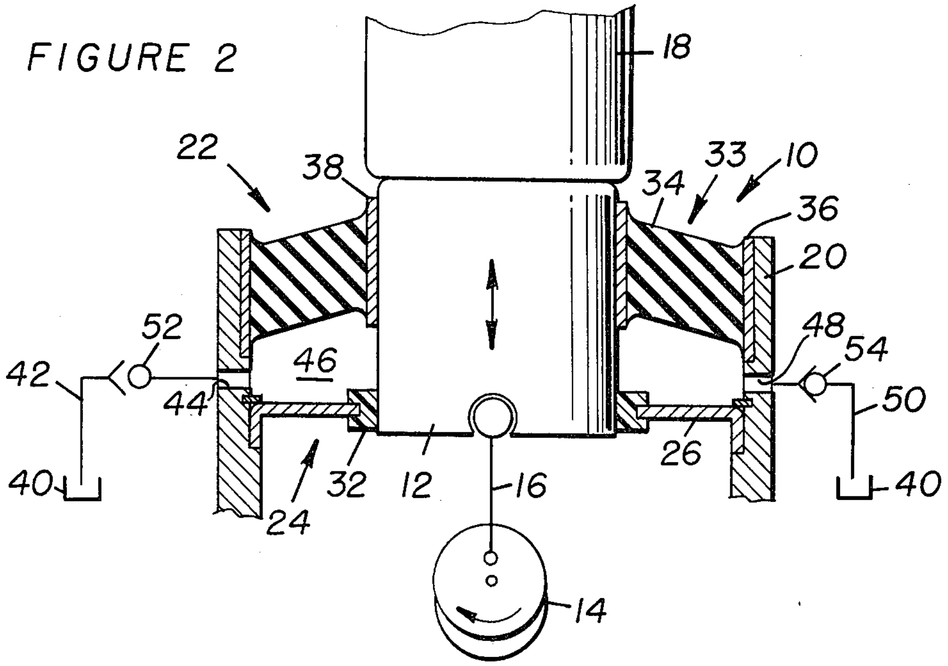
FIG. 2 is the same embodiment depicted in FIG. 1 with the reciprocating member in the fully extended position.

In operation, eccentric 14 acts on reciprocating member 12 to cause it to move upwardly as indicated in FIGS. 1 and 2. As the reciprocating member 12 moves upwardly to the position shown in FIG. 2 the check valve 52 opens allowing fluid from the source of cooling fluid 40 to be drawn into variable volume cavity 46. Simultaneously check valve 54 closes to prevent fluid from being discharged through the return conduit 50 back to the source of cooling fluid 40. Seal 32 prevents the cooling fluid in variable volume cavity 46 from flowing into the area adjacent eccentric 14 in housing 20. Similarly seal 32 prevents lubricant adjacent eccentric 14 from entering cavity 46. Continued rotation of the eccentric member 14 causes reciprocating member 12 to move downwardly to the position shown in FIG. 1 simultaneously closing check valve 52 and opening check valve 54 thus discharging fluid from variable volume cavity 46 through conduit 50 to the source of cooling fluid 40. It is recognized that this is the familiar pumping action of a diaphragm pump however in this particular instance the actuating member, reciprocating member 12, passes completely through the analagous pump chamber to act on a hammer 18 in the opposite side of the power source or eccentric 14. The pumping action is utilized to provide cooling fluid to and in the vicinity of the reciprocating member 12. The cooling fluid may be oil, water, or even air. Thus, the hot oil normally associated with the eccentric 14 is separated by the cavity 46 from elastomeric seal 34 which, by its nature, is susceptible to fatigue caused by heat, and if elastomeric seal 34 is of a natural rubber the oil itself.

Other aspects, objects and advantages of this invention can be obtained from a study of the drawings, the disclosure and the appended claims.

I claim:

1. In a seal arrangement for a device having a housing (20), and a reciprocating member (12) mounted in said housing (20), the improvement comprising:

first seal means (24) for sealingly associating the reciprocating member (12) with said housing (20);

second seal means (33) for sealingly associating the reciprocating member (12) with said housing (20) and forming a substantially fluid tight variable volume cavity (46) with said first seal means (24);

a source of cooling fluid (40);

means (42,52,44), for communicating said source of cooling fluid (40) to said variable volume cavity (46).

2. The seal arrangement of claim 1 further comprising separate means (48,50,54) for communicating fluid from the variable volume cavity to said source.

3. The seal arrangement of claim 1 wherein the first seal means (24) comprises a relatively low friction portion (32) in sliding engagement with the reciprocating member (12).

4. The seal arrangement of claim 3 wherein the relatively low friction portion (32) is comprised of a material relatively insensitive to heat.

5. The seal arrangement of claim 3 wherein the relatively low friction (32) portion is comprised of a relatively inert material.

6. The seal arrangement of claim 1 or claim 3 wherein the second seal means (33) is comprised of a synthetic elastomeric member affixed to the reciprocating member.

7. The seal arrangement of claim 1 wherein the means (42,52,44) for connecting the source of cooling fluid to the variable volume cavity (46) comprises a conduit (42) and a check valve (52), said check valve disposed in said conduit.

8. The seal assembly of claim 1 wherein the second seal means (33) comprises an elastomeric member (34) affixed both to the housing (22) and to the reciprocating member (12).

9. The seal assembly of claim 8 wherein the first seal means (24) comprises a first substantially rigid portion (26) affixed to the housing (20) and a second relatively low friction portion (32) in sliding engagement with the reciprocating member (12).

10. The seal assembly of claim 4 or claim 9 wherein the relatively low friction portion (32) is comprised of polytetrafluoroethylene.

11. The seal assembly of claim 4 or claim 9 wherein the relatively low friction portion 32 is comprised of a mixture of polytetrafluoroethylene and nylon.

12. A self pumping seal for a reciprocating assembly, the reciprocating assembly including a housing (20) and a reciprocating member (12) mounted in said housing (20), comprising:

relatively rigid seal means (24) for sealingly associating the reciprocating member (12) with said housing (20);

flexible seal means (33) for sealingly associating the reciprocating member (12) with said housing (20) distal of said relatively rigid seal means (24), said flexible seal means (33) and said relatively rigid seal means (24) forming a substantially fluid tight variable volume cavity (46);

a source of cooling fluid (40);

means (42,52,44) for communicating said source of cooling fluid to said variable volume cavity (46); and separate means (48,54,50) for communicating cooling fluid from said variable volume cavity (46) to said source of cooling fluid (40).

* * * * *